United States Patent
Omote (10) Patent No.: US 9,086,005 B2
(45) Date of Patent: Jul. 21, 2015

(54) EXHAUST PURIFICATION SYSTEM FOR INTERNAL COMBUSTION ENGINE

(75) Inventor: Hiroshi Omote, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 299 days.

(21) Appl. No.: 13/643,861

(22) PCT Filed: Apr. 28, 2011

(86) PCT No.: PCT/JP2011/060358
§ 371 (c)(1),
(2), (4) Date: Oct. 26, 2012

(87) PCT Pub. No.: WO2011/136320
PCT Pub. Date: Nov. 3, 2011

(65) Prior Publication Data
US 2013/0052095 A1    Feb. 28, 2013

(30) Foreign Application Priority Data
Apr. 30, 2010  (JP) ................. 2010-105974

(51) Int. Cl.
*F01N 3/10* (2006.01)
*B01D 53/34* (2006.01)
*F01N 3/20* (2006.01)

(52) U.S. Cl.
CPC ........... *F01N 3/2066* (2013.01); *F01N 2240/20* (2013.01); *F01N 2240/25* (2013.01); *F01N 2610/02* (2013.01); *F01N 2610/102* (2013.01); *Y02T 10/24* (2013.01)

(58) Field of Classification Search
None
See application file for complete search history.

(56) References Cited

U.S. PATENT DOCUMENTS

2007/0036694 A1    2/2007  Nishioka et al.

FOREIGN PATENT DOCUMENTS

| EP | 1 748 162 A1 | 1/2007 |
|---|---|---|
| JP | 08-177467 A | 7/1996 |
| JP | 2009-041371 A | 2/2009 |
| JP | 2010-038020 A | 2/2010 |

OTHER PUBLICATIONS

International Search Report of International Application No. PCT/JP2011/060358, mailed Jul. 12, 2011, (2) pages.
Extended European Search Report mailed Nov. 20, 2013 for European Appl. No. 11 77 5101, 5 pages.

*Primary Examiner* — Walter D Griffin
*Assistant Examiner* — Jelitza Perez
(74) *Attorney, Agent, or Firm* — Sterne, Kessler, Goldstein & Fox P.L.L.C.

(57) ABSTRACT

Disclosed is an exhaust purification system (2) for an internal combustion engine (1), which comprises: a reduction catalyst (6) that is arranged in an exhaust pipe (exhaust passage) (3) of the internal combustion engine (1); and a reducing agent spraying device (4) for spraying a reducing agent within the exhaust pipe (3) in the upstream of the reduction catalyst (6). A dispersing member (member for promoting evaporation of the reducing agent) (5) is arranged at a position, which is in the upstream of the reduction catalyst (6) within the exhaust pipe (3), and to which the reducing agent is sprayed from the reducing agent spraying device (4). The dispersing member (5) is formed of a porous member and affixed within the exhaust pipe (3) such that the dispersing member (5) is parallel to the flowing direction of the exhaust gas.

6 Claims, 7 Drawing Sheets

Fig. 7

EXHAUST PURIFICATION SYSTEM FOR INTERNAL COMBUSTION ENGINE

TECHNICAL FIELD

The present invention relates to an art of an exhaust purification system purifying exhaust gas discharged from an internal combustion engine via an exhaust pipe.

BACKGROUND ART

Conventionally, as a method for purifying nitrogen oxides (NOx) in exhaust gas discharged from an internal combustion engine via an exhaust pipe, an art is known in which urea water as a reducing agent is injected into the exhaust pipe and the nitrogen oxides are reduced and purified by a reduction catalyst arranged at the downstream side (Selective Catalytic Reduction).

For increasing purification efficiency of exhaust gas by this method, it is necessary to evaporate efficiency the urea water injected into the exhaust pipe and generate ammonia uniformly in the exhaust pipe.

For example, when the temperature of exhaust gas in the exhaust pipe is low, the urea water injected into the exhaust pipe cannot be evaporated efficiency. Accordingly, time is required for generating ammonia uniformly in the exhaust pipe, whereby the length of the exhaust pipe must be long.

However, since the length of the exhaust pipe is long in this construction, there is a problem in that large space is required for establishing the exhaust pipe. Furthermore, there is a problem in that the urea water tends to adhere to the wall surface inside the exhaust pipe and the adhering urea water is crystallized.

Then, an art is known in which a metal mesh member and a dispersing member mixing and dispersing urea water are arranged in the exhaust pipe oppositely to flow direction of exhaust gas (for example, see the Patent Literature 1).

According to this art, urea water injected into the exhaust pipe collides with the mesh member and fragmentized, and then mixed with the exhaust gas passing through the mesh member. The fragmentized urea water collides with the dispersing member provided downstream the mesh member so as to be mixed and dispersed efficiently in the exhaust pipe. Since the metal mesh member is heated by the heat of the exhaust gas, the evaporation of the urea water colliding with the mesh member is promoted.

Therefore, according to this art, ammonia can be generated uniformly in the exhaust pipe. Namely, it is not necessary to extend the length of the exhaust pipe, and large space for setting up the exhaust pipe is not required. Furthermore, the urea water is prevented from adhering to the wall surface inside the exhaust pipe and being crystallized.

However, according to the art described in the Patent Literature 1, the exhaust gas in the exhaust pipe passes through the mesh member and the dispersing member arranged oppositely to the flow direction of the exhaust gas. Accordingly, pressure loss of the exhaust gas occurs when the exhaust gas passes through the mesh member and the dispersing member. As a result, there is a problem in that pressure upstream the mesh member and the dispersing member in the exhaust pipe rises so that the performance of the internal combustion engine is decreased.

Therefore, according to the art described in the Patent Literature 2, a metal mesh member formed platy is established rotatably in the exhaust pipe. Then, when urea water is not injected, the mesh member is rotated so as to be directed in parallel to flow direction of exhaust gas. On the other hand, when the urea water is injected, the mesh member is rotated so as to be directed oppositely to the injection direction of the urea water (in other words, not parallel to the flow direction of the exhaust gas), whereby the urea water collides with the mesh member.

According to this art, when the urea water is not injected, the mesh member is rotated so as to be directed in parallel to the flow direction of the exhaust gas. Accordingly, pressure loss of the exhaust gas does not occur when the exhaust gas passes through the mesh member so that pressure upstream the mesh member in the exhaust pipe is prevented from rising, whereby the performance of the internal combustion engine is prevented from being decreased.

Patent Literature 1: the Japanese Patent Laid Open Gazette 2009-41371

Patent Literature 2: the Japanese Patent Laid Open Gazette 2010-38020

DISCLOSURE OF INVENTION

Problems to be Solved by the Invention

However, according to the art described in the Patent Literature 2, when the urea water is injected, the mesh member is rotated so as to be directed in non-parallel to the flow direction of the exhaust gas. Accordingly, there is a problem in that pressure loss occurs when the exhaust gas passes through the mesh member and pressure upstream the mesh member in the exhaust pipe rises so that the performance of the internal combustion engine is decreased.

The present invention is provided in consideration with the above problems, and the problem to be solved by the invention is to provide an exhaust purification system for an internal combustion engine in which ammonia is generated uniformly in an exhaust pipe, nitrogen oxides in exhaust gas are reduced and purified efficiently by a reduction catalyst, and it prevents decrease of performance of the internal combustion engine caused by rising of pressure in the exhaust pipe.

Means for Solving the Problems

According to claim 1, an exhaust purification system for an internal combustion engine includes a reduction catalyst arranged in an exhaust passage of the internal combustion engine, and a reducing agent injecting device injecting a reducing agent into the exhaust passage upstream the reduction catalyst. A reducing agent evaporation promotion member is established upstream the reduction catalyst in the exhaust passage and at a position to which the reducing agent injected from the reducing agent injecting device is sprayed. The reducing agent evaporation promotion member is formed by a porous member and fixed to the inside of the exhaust passage so as to be in parallel to flow direction of exhaust gas.

According to claim 2, the reducing agent is urea water.

According to claim 3, the reducing agent injecting device has an injection nozzle, and the injection nozzle is a single-fluid nozzle.

Effect of the Invention

The present invention constructed as the above brings the following effects.

According to claim 1, in the exhaust purification system of the internal combustion engine, ammonia is generated uniformly in the exhaust passage, nitrogen oxides in the exhaust gas are reduced and purified efficiently by the reduction catalyst, and the decrease of performance of the internal combustion engine caused by the increase of pressure in the exhaust passage is prevented.

According to claim 2, the exhaust purification system of the internal combustion engine can be built more easily.

According to claim 3, the exhaust purification system of the internal combustion engine can be built with easier construction.

DESCRIPTION OF NOTATIONS 1 internal combustion engine
2 exhaust purification system (SCR)
3 exhaust pipe
4 reducing agent injecting device
5 dispersing member
5a plate surface

DETAILED DESCRIPTION OF THE INVENTION

Figure 1:
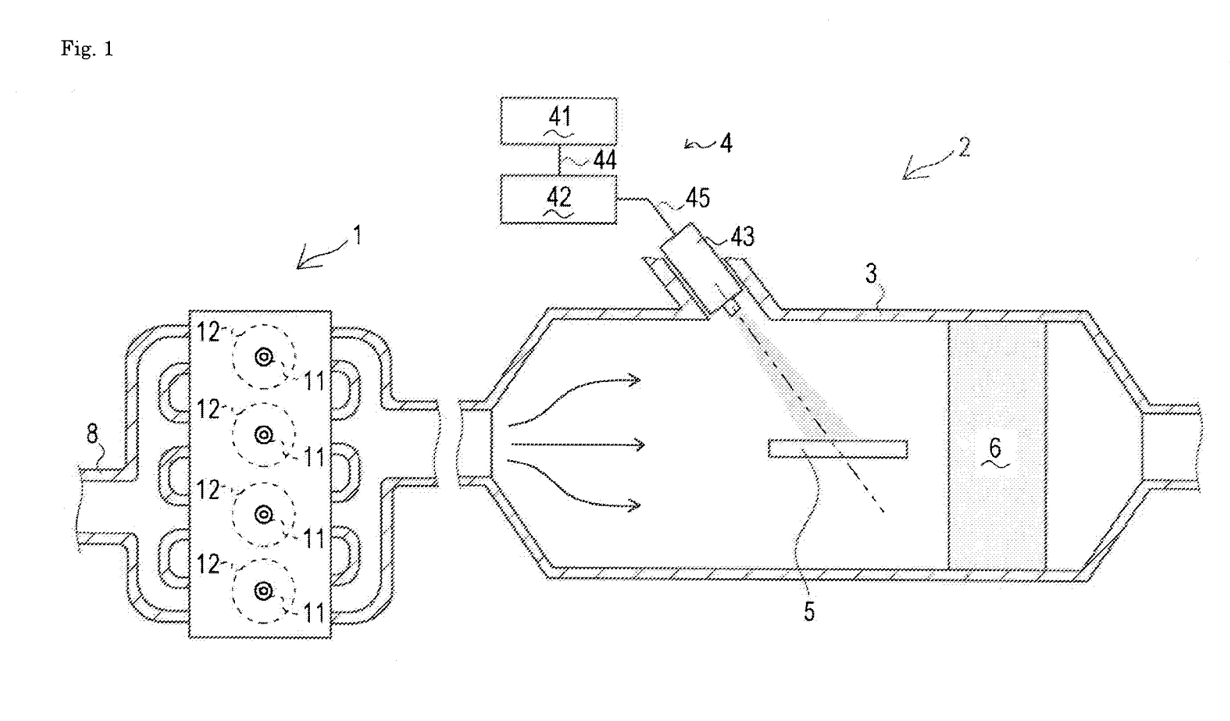
FIG. 1 A schematic explanation drawing of an exhaust purification system for an internal combustion engine according to an embodiment of the present invention.

An explanation will be given on construction of an exhaust purification system 2 for an internal combustion engine 1 according to an embodiment of the present invention referring to FIG. 1.

The exhaust purification system 2 for the internal combustion engine 1 is a system (so-called SCR) purifying nitrogen oxides in exhaust gas generated in the internal combustion engine 1. The exhaust purification system 2 for the internal combustion engine 1 includes an exhaust pipe 3 which is an exhaust passage of exhaust gas, a reducing agent injecting device 4, a dispersing member 5 and a reduction catalyst 6.

The internal combustion engine 1 has one or more cylinders 12. In the internal combustion engine 1, fuel injected to the cylinders 12 is burnt and energy generated by this combustion is exchanged into rotational power. In the internal combustion engine 1, outside air supplied via an intake pipe 8 and fuel supplied via four fuel injection valves 11 are mixed and burnt in the four cylinders 12, whereby exhaust gas is generated. The exhaust gas is discharged to the outside of the internal combustion engine 1 via the exhaust pipe 3. In this embodiment, the internal combustion engine 1 is an in-line four-cylindered engine, but the internal combustion engine 1 is not limited thereto.

The reducing agent injecting device 4 injects reducing agent to exhaust gas flowing in the exhaust pipe 3. The reducing agent injecting device 4 includes a reducing agent tank 41, a reducing agent pump 42 and an injection nozzle 43.

The reducing agent is supplied into the exhaust gas so as to reduce and purify components of the exhaust gas with the reduction catalyst 6. In this embodiment, urea water is used as the reducing agent.

The reducing agent injecting device 4 is an embodiment of the "reducing agent injecting device" according to the present invention.

The reducing agent tank 41 stores the urea water. The reducing agent tank 41 is communicated with the reducing agent pump 42 via a supply passage 44.

The reducing agent pump 42 sends with pumping the urea water stored in the reducing agent tank 41 toward the injection nozzle 43. The reducing agent pump 42 is communicated with the injection nozzle 43 via a supply passage 45. In this embodiment, an electric pump is used as the reducing agent pump 42. The reducing agent pump 42 is connected electrically to a control means (not shown in figures) and controlled pressure in the supply passage 45 to be predetermined pressure with the urea water pressingly sent toward the injection nozzle 43.

The injection nozzle 43 injects the urea water into the exhaust pipe 3. In this embodiment, a single-fluid nozzle is used as the injection nozzle 43. The injection nozzle 43 injects the urea water in the supply passage 45 aslant toward the downstream side of the exhaust gas in the exhaust pipe 3 corresponding to the pressure in the supply passage 45 pressingly sent by the reducing agent pump 42 (the urea water is not mixed with gas).

The dispersing member 5 mixes and disperses the urea water in the exhaust gas and promotes evaporation of the urea water. The dispersing member 5 is formed platy by a porous member including ceramic or metal. The dispersing member 5 is provided horizontally at the downstream of the injection nozzle 43 and in the vertical middle portion of the inside of the exhaust pipe 3. Namely, the dispersing member 5 is provided in parallel to the flow of the exhaust gas so that the plane center of the dispersing member 5 is positioned on the extension of the injection center line of the injection nozzle 43. Accordingly, the urea water injected from the injection nozzle 43 collides with (is sprayed to) the dispersing member 5 aslant.

By injecting the urea water from the injection nozzle 43 to the dispersing member 5 shower-like or atomizingly, fine grains of the urea water before colliding with the dispersing member 5 evaporate easily. When the urea water collides with the dispersing member 5 and rebounds, the urea water is fragmentized and dispersed in the exhaust pipe 3, and evaporates easily. Since the temperature of the dispersing member 5 becomes high by the heat of the exhaust gas, the evaporation of the urea water colliding with the dispersing member 5 is promoted (see FIG. 3).

Accordingly, ammonia is generated uniformly in the exhaust pipe 3, and the urea water is prevented from adhering to the wall surface in the exhaust pipe 3 and crystallizing. "The position with which the injected urea water collides" is not the position with which the injected urea water collides after riding on the flow of the exhaust gas but the position with which the urea water collides by the force of the injection.

The dispersing member 5 is an embodiment of the "reducing agent evaporation promotion member" according to the present invention.

The reduction catalyst 6 reduces and purifies nitrogen oxides in the exhaust gas so as to make them harmless. The reduction catalyst 6 is provided in the exhaust pipe 3 and arranged downstream the dispersing member 5. In this embodiment, a selective reduction catalyst is used as the reduction catalyst 6. The urea water supplied to (mixed with and diffused in) the exhaust gas is hydrolyzed by the heat of the exhaust gas flowing in the exhaust pipe 3, whereby ammonia is generated. Then, the generated ammonia is reacted with the nitrogen oxides in the exhaust gas so that the nitrogen oxides are reduced and resolved into nitrogen and water (made harmless).

The reduction catalyst 6 is an embodiment of the "reduction catalyst" according to the present invention.

A particulate filter (hereinafter, referred to as "DPF") (not shown) may be provided in the exhaust purification system 2 of the internal combustion engine 1. The DPF collects particulate matters (hereinafter, referred to as "PM") in the exhaust gas. The DPF is provided in the exhaust pipe 3 and arranged upstream the exhaust purification system 2 (SCR) of the internal combustion engine 1. In the DPF, an oxidation catalyst such as platinum and a honeycomb structure are stored in series in a filter casing substantially cylindrical in a casing made by heat-resistant metal. The DPF collects the PM with the honeycomb structure and makes the collected PM burn so as to remove it with the oxidation catalyst.

In the above-mentioned construction, in the exhaust purification system 2 of the internal combustion engine 1, against the exhaust gas generated in the internal combustion engine 1, the urea water stored in the reducing agent tank 41 is pressingly sent toward the injection nozzle 43 by the reducing agent pump 42 and injected into the exhaust pipe 3 from the injection nozzle 43. The urea water colliding with (sprayed to) the dispersing member 5 in the exhaust pipe 3 is mixed and dispersed in the exhaust pipe 3. The evaporation of the urea water is promoted by the dispersing member 5 heated by the heat of the exhaust gas, ammonia is generated uniformly in the exhaust pipe 3. Then, the ammonia is reacted with the nitrogen oxides in the exhaust gas by the reduction catalyst 6 so that the nitrogen oxides are reduced and purified.

As mentioned above, when the DPF is attached to the exhaust purification system 2 of the internal combustion engine 1, the urea water is injected to the exhaust gas in which the PM has been collected by the DPF, whereby the nitrogen oxides in the exhaust gas are reduced and purified.

Next, explanation will be given on construction of a dispersing member 50 which is an example of a conventional dispersing member referring to FIGS. 4 to 6 so as to clarify the construction of the dispersing member 5.

Figure 5:
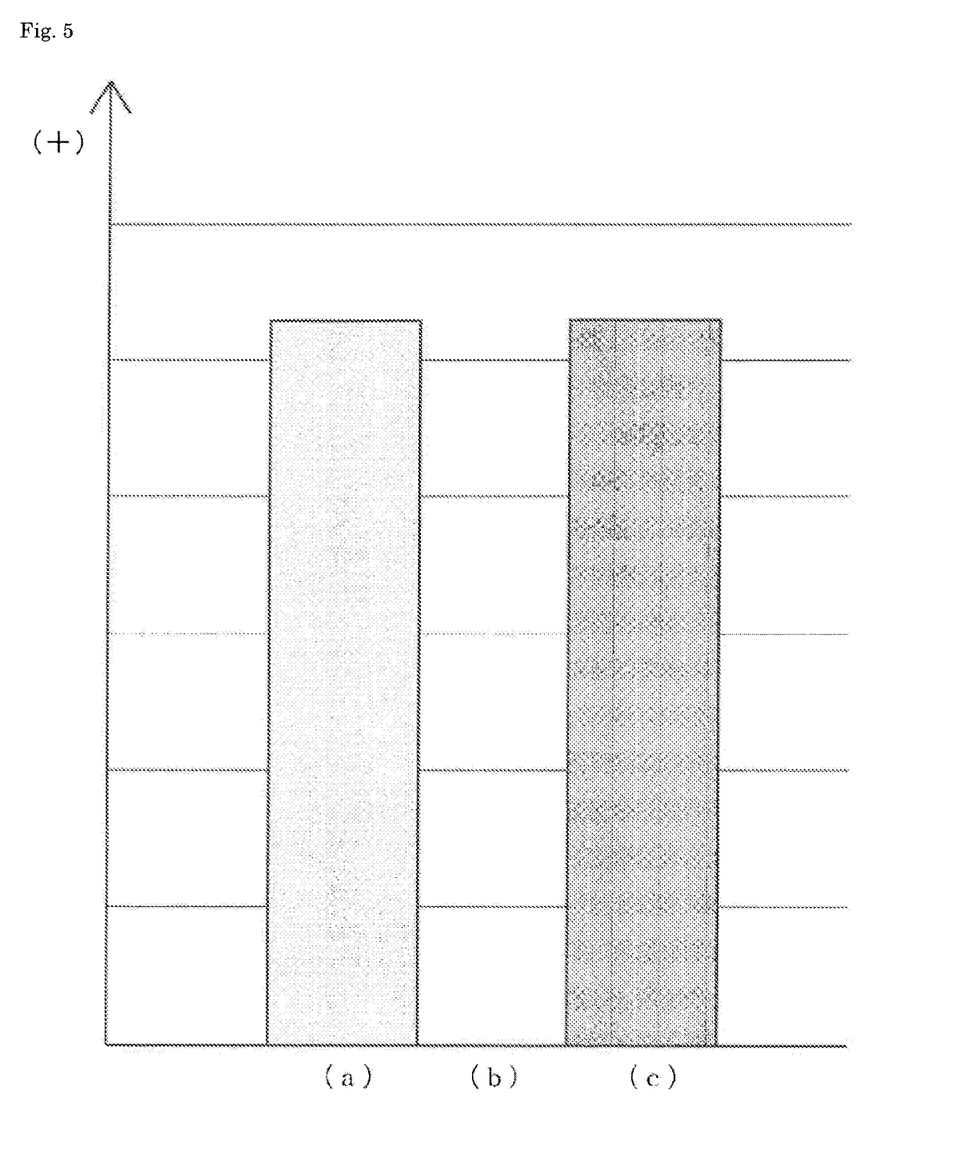
FIG. 5 A graph of exhaust pipe pressure loss, urea water amount crystallized on a wall surface, and ammonia generation amount in the state in which the conventional dispersing member is installed.
Figure 6:
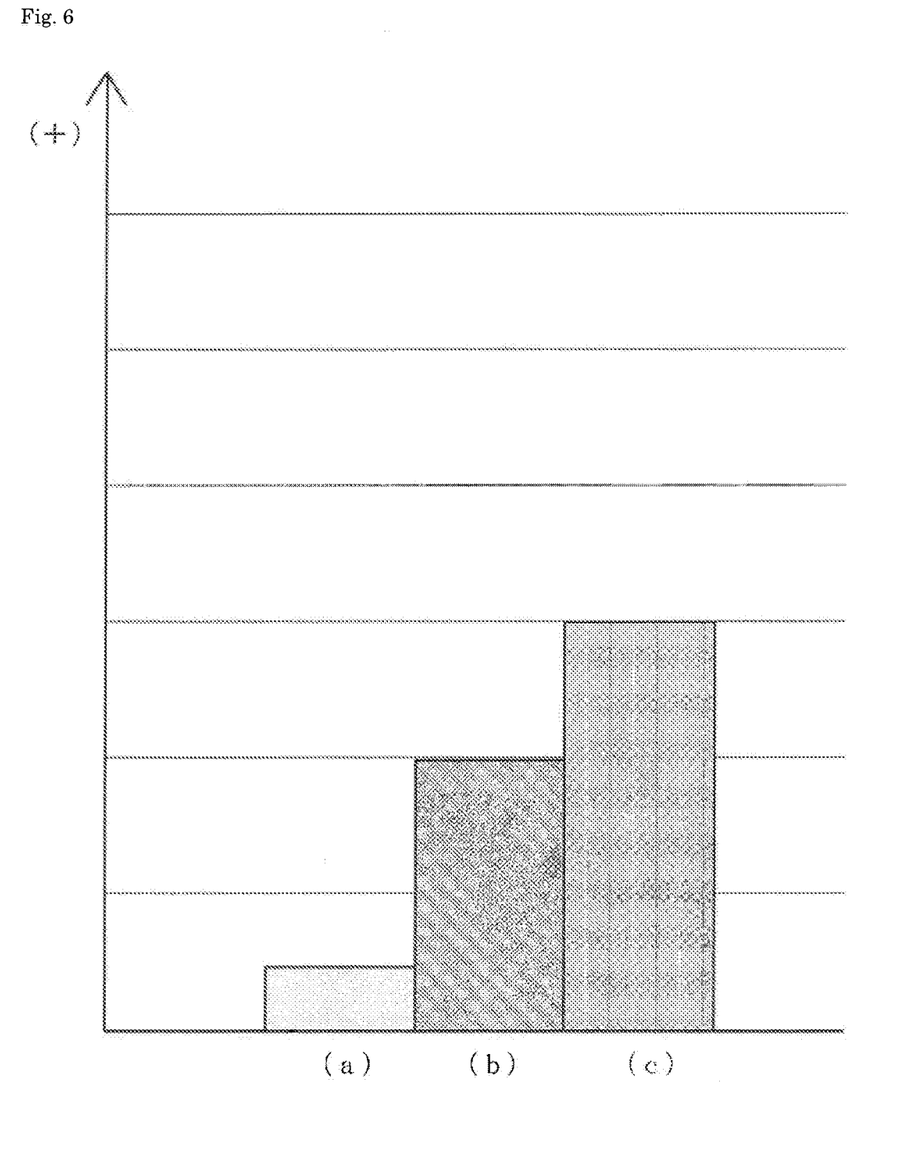
FIG. 6 A graph of exhaust pipe pressure loss, urea water amount crystallized on a wall surface, and ammonia generation amount in the state in which any dispersing member is not installed.

In the graphs of FIGS. 5 and 6, a reference letter (a) indicates "exhaust pipe pressure loss". A reference letter (b) indicates "urea water amount crystallized on a wall surface". A reference letter (c) indicates "ammonia generation amount".

In the conventional dispersing member 50, a metal mesh member is formed plate-like. The dispersing member 50 is arranged so as to be rotatable in the exhaust pipe 3 by a rotating device (not shown). The dispersing member 50 is rotated so as to be directed oppositely to the flow direction of the exhaust gas (in FIG. 4, rightward direction). When the urea water is not injected from the injection nozzle 43, the dispersing member 50 is rotated so as to be directed in parallel to the flow direction of the exhaust gas. On the other hand, when the urea water is injected from the injection nozzle 43, the dispersing member 50 is rotated so as to be directed oppositely to the injection direction of the urea water (not parallel to the flow direction of the exhaust gas).

Figure 4:
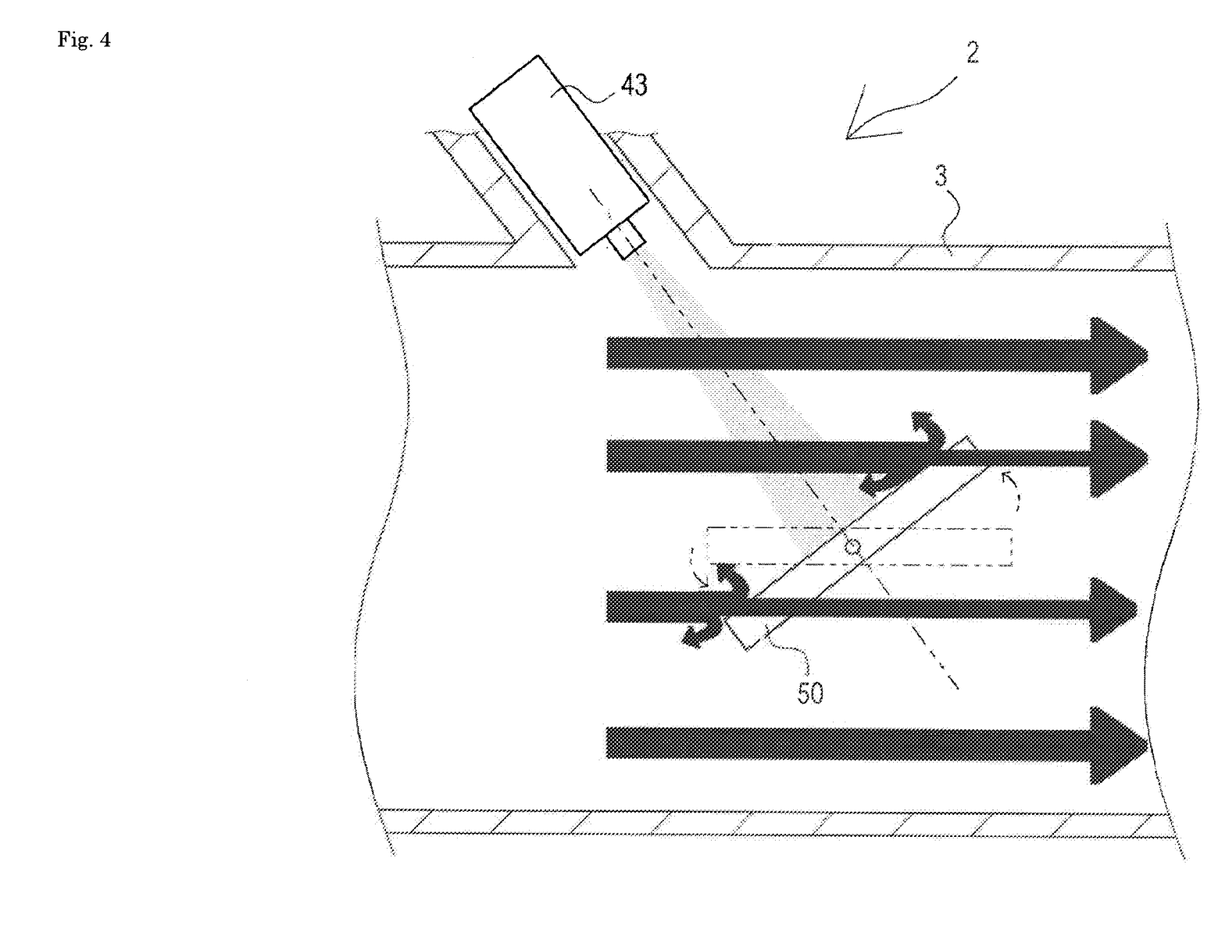
FIG. 4 A schematic explanation drawing of a conventional dispersing member.

According to the construction, though the dispersing member 50 is formed by the mesh member having high air-permeability, as shown in FIG. 5, when the urea water is injected from the injection nozzle 43, pressure loss is caused when the exhaust gas passes through the dispersing member 50 (see the bold arrow in FIG. 4). As a result, the pressure at the side upstream the dispersing member 50 in the exhaust pipe 3 is raised, whereby the performance of the internal combustion engine is decreased.

For preventing the pressure loss of the exhaust gas in the exhaust pipe 3, for example, when the dispersing member 50 is not provided in the exhaust pipe 3, that is, the urea water injected into the exhaust pipe 3 collides with anybody, the pressure loss of the exhaust gas in the exhaust pipe 3 can be reduced as shown in FIG. 6. However, in this case, as shown in FIG. 6, the urea water injected into the exhaust pipe 3 is hard to be mixed and dispersed. Namely, the urea water becomes easy to adhere to the wall surface inside the exhaust pipe 3, and the adhering urea water is crystallized.

Figure 2:
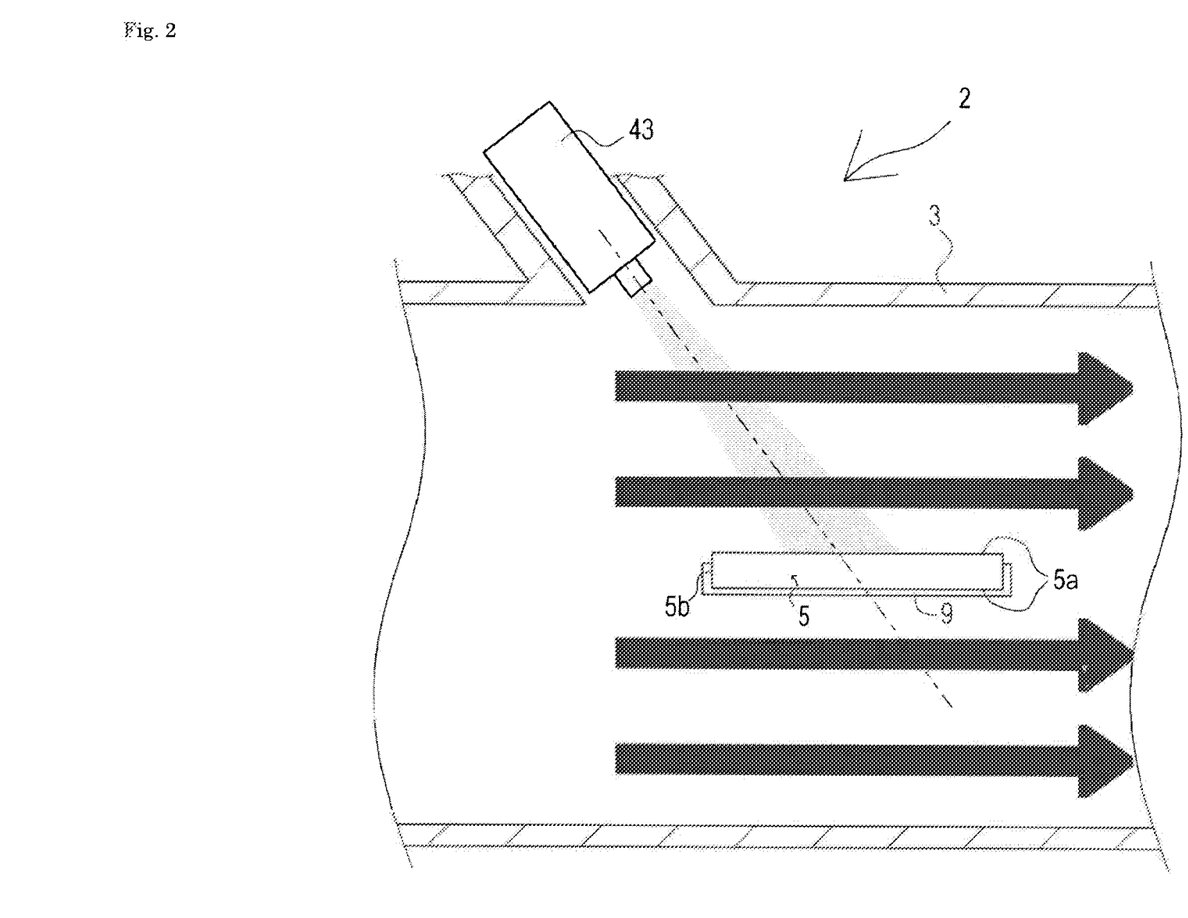
FIG. 2 A schematic explanation drawing of a dispersing member.

Next, explanation will be given on the construction of the dispersing member 5 in more detail referring to FIGS. 2 and 3.

Figure 3:
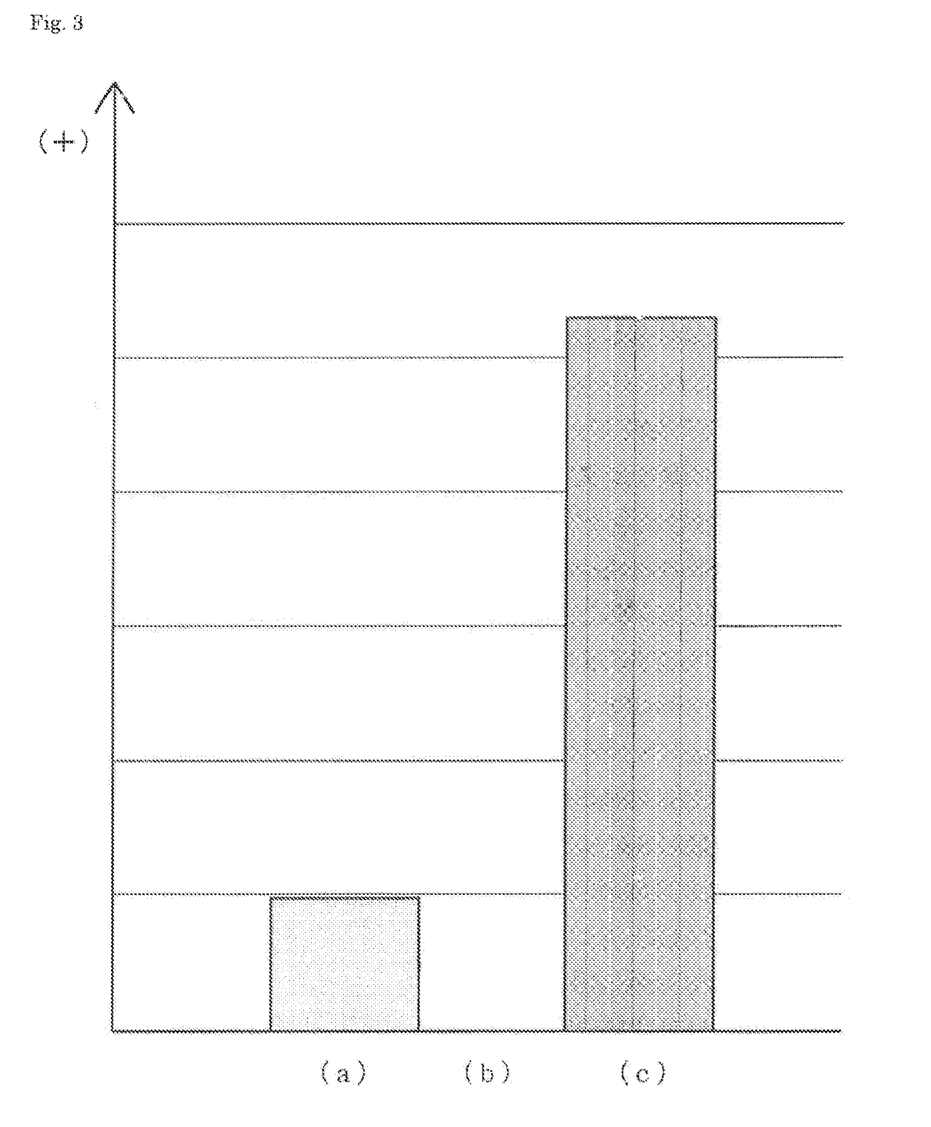
FIG. 3 A graph of exhaust pipe pressure loss, urea water amount crystallized on a wall surface, and ammonia generation amount.

In the graph of FIG. 3, a reference letter (a) indicates "exhaust pipe pressure loss". A reference letter (b) indicates "urea water amount crystallized on a wall surface". A reference letter (c) indicates "ammonia generation amount".

As mentioned above, the dispersing member 5 in this embodiment is formed by the porous member including ceramic or metal.

According to the construction, when the urea water collides with the dispersing member 5, the urea water can be evaporated in a moment by the heat of the exhaust gas stored in the dispersing member 5.

The dispersing member 5 is formed plate-like and arranged in the exhaust pipe 3 so as to be in parallel to the flow direction of the exhaust gas. In more detail, while the exhaust gas generated in the internal combustion engine 1 flows in the exhaust pipe 3 from the left side to the right side in FIG. 2, the dispersing member 5 formed plate-like is arranged so that a pair of obverse and reverse plate surfaces 5a is in parallel to the lateral direction. Namely, the part of the dispersing member 5 opposite to the flow direction of the exhaust gas is a side surface 5b with small area.

According to the construction, as shown in FIG. 3, the pressure loss generated when the exhaust gas passes through the dispersing member 5 from the left side to the right side is decreased further in comparison with the conventional dispersing member 50.

In the exhaust pipe 3, the dispersing member 5 can be constructed so that the pair of obverse and reverse plate surfaces 5a are parallel in the lateral direction and in parallel to the horizontal direction. In this case, the dispersing member 5 is established in the wall surface of the exhaust pipe 3 while the pair of obverse and reverse plate surfaces 5a are directed respectively upward and downward in the vertical direction.

The dispersing member 5 is fixed to the wall surface of the exhaust pipe 3. Namely, the dispersing member 5 is not rotated as the conventional dispersing member 50. As a result, the two end surfaces of the dispersing member 5 at the side of the wall surface in the exhaust pipe 3 can be provided continuously to the wall surface in the exhaust pipe 3, whereby any gap is not formed between these members.

For example, if the dispersing member 5 is rotated, that is, gaps are formed between the two end surfaces of the dispersing member 5 at the side of the wall surface in the exhaust pipe 3 and the wall surface in the exhaust pipe 3, the urea water injected from the injection nozzle 43 into the exhaust pipe 3 may enter the gaps, adhere to the wall surface and be crystallized.

However, as this embodiment, the two end surfaces of the dispersing member 5 at the side of the wall surface in the exhaust pipe 3 can be provided continuously to the wall surface in the exhaust pipe 3, whereby any gap is not formed between these members. Namely, the urea water is prevented from entering gaps between these members, adhering to the wall surface in the exhaust pipe 3 and being crystallized.

The method for fixing the dispersing member 5 to the wall surface of the exhaust pipe 3 is not limited. Namely, the dispersing member 5 may be provided integrally with the exhaust pipe 3. For example, it may alternatively be constructed so that a dispersing member casing 9 is established inside the exhaust pipe 3 and the dispersing member 5 is exchangeably fixed to the dispersing member casing 9. According to this construction, when the dispersing member 5 is polluted by the PM in the exhaust gas, the dispersing member 5 can be exchanged with a new dispersing member 5 or can be removed from the wall surface of the exhaust pipe 3, washed and then attached to the wall surface of the exhaust pipe 3 again.

In this embodiment, the dispersing member 5 is fixed to the wall surface of the exhaust pipe 3, whereby any rotating device for the dispersing member 50 is not necessary in comparison with the conventional exhaust purification system having the dispersing member 50 provided rotatably. Therefore, the exhaust purification system 2 of the internal combustion engine 1 can be built with very small number of parts and easy construction. Especially, the temperature of the inside of the exhaust pipe 3 becomes high by the exhaust gas at the time of driving the internal combustion engine 1 and becomes low (the same as the temperature of the outside air) at the time of not driving the internal combustion engine 1, whereby the inside of the exhaust pipe 3 is bad environment with intense change of temperature. Therefore, in the exhaust pipe 3, the high durability of the exhaust purification system 2 is required. The exhaust purification system 2 does not have the rotating device for the dispersing member 50 so as to make the number of parts very small, thereby improving the durability.

In this embodiment, the dispersing member 5 is arranged so that the center of the plane of the dispersing member 5 is positioned on the extension of the axis of injection of the injection nozzle 43. However, the dispersing member 5 may alternatively be arranged so that the center of the plane of the dispersing member 5 is positioned behind the extension of the axis of injection of the injection nozzle 43. Namely, when the urea water injected from the injection nozzle 43 flows along the flow direction of the exhaust gas (the rightward direction in FIG. 1) by the flow of exhaust gas and collides with the dispersing member 5 (while keeping the force of the injection), the dispersing member 5 is arranged at the position at which the urea water flows. Namely, it is only necessary to arrange the dispersing member 5 at the position at which the urea water injected from the injection nozzle 43 collides with the dispersing member 5, and the position of the dispersing member 5 in the flow direction of the exhaust gas is not limited.

As mentioned above, the exhaust purification system 2 of the internal combustion engine 1 according to the embodiment of the present invention includes
the reduction catalyst 6 arranged in the exhaust pipe 3 (exhaust passage) of the internal combustion engine 1, and
the reducing agent injecting device 4 injecting the reducing agent into the exhaust pipe 3 from the side upstream the reduction catalyst 6.

The dispersing member 5 (reducing agent evaporation promotion member) is established upstream the reduction catalyst 6 in the exhaust pipe 3 and at the position to which the reducing agent injected from the reducing agent injecting device 4 is sprayed.

The dispersing member 5 is formed by the porous member and fixed to the inside of the exhaust pipe 3 so as to be in parallel to the flow direction of the exhaust gas.

According to the construction, in the exhaust purification system 2 of the internal combustion engine 1, ammonia is generated uniformly in the exhaust pipe 3, the nitrogen oxides in the exhaust gas are reduced and purified efficiently by the reduction catalyst 6, and the decrease of performance of the internal combustion engine 1 caused by the increase of pressure in the exhaust pipe 3 is prevented.

In the exhaust purification system 2 of the internal combustion engine 1 according to the embodiment of the present invention, the reducing agent is preferably the urea water.

According to the construction, in the exhaust purification system 2 of the internal combustion engine 1, the reduction catalyst can be handled easily in comparison with the case in which ammonia being virulent and difficult to be handled for example. Accordingly, the exhaust purification system 2 of the internal combustion engine 1 can be built more easily.

In the exhaust purification system 2 of the internal combustion engine 1 according to the embodiment of the present invention,
the reducing agent injecting device 4 has the injection nozzle 43, and
the injection nozzle 43 is preferably a single-fluid nozzle.

According to the construction, in the exhaust purification system 2 of the internal combustion engine 1, the reducing agent can be injected into the exhaust pipe 3 only by the pressure of liquid (reducing agent) (without being mixed with gas) in comparison with the case of using a double-fluid nozzle for example. Accordingly, the exhaust purification system 2 of the internal combustion engine 1 can be built with easier construction without increasing the number of parts.

Figure 7:
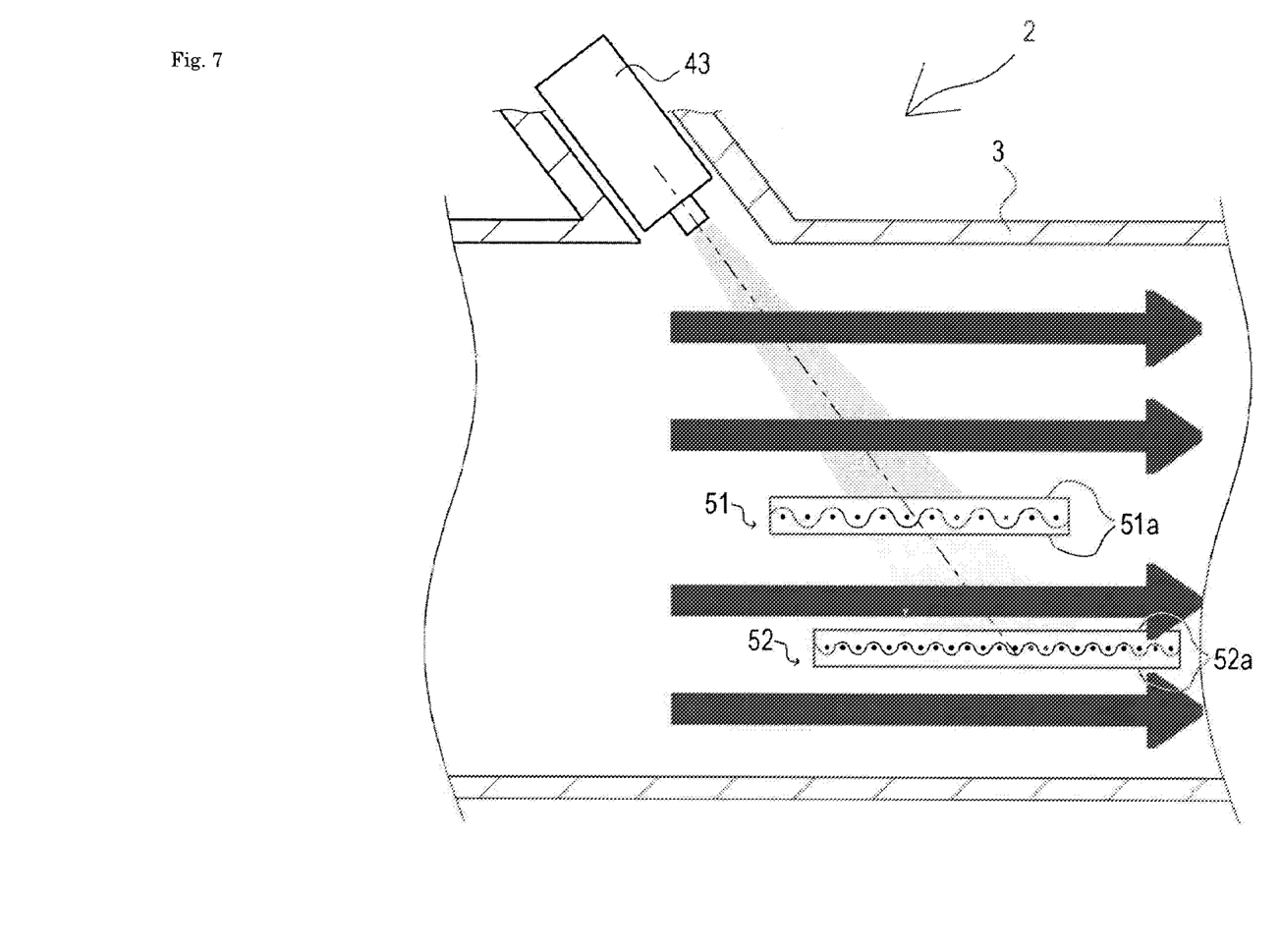
FIG. 7 A schematic explanation drawing of a dispersing member according to another embodiment of the present invention.

As another embodiment, as shown in FIG. 7, dispersing members with different fineness of nets (meshes) may alternatively be arranged at upper and lower sides.

In more detail, upper and lower two dispersing members (hereinafter, the upper dispersing member is referred to as "upper dispersing member 51" and the lower dispersing member is referred to as "lower dispersing member 52") are arranged. The plane center of each of the upper dispersing member 51 and the lower dispersing member 52 is arranged on the extension of the axis of injection of the injection nozzle 43. The upper dispersing member 51 is arranged horizontally near the vertical center of the inside of the exhaust pipe 3. The lower dispersing member 52 is arranged horizontally below and downstream the upper dispersing member 51. Each of the upper dispersing member 51 and the lower dispersing member 52 is formed by metal so as to be a mesh or a plate in which many holes are opened. The fineness of the meshes of the upper dispersing member 51 and the lower dispersing member 52 is constructed so that the mesh of the upper dispersing member 51 is rough and that of the lower dispersing member 52 is fine. Preferably, a pair of obverse and reverse plate surfaces 52a of the lower dispersing member 52 are larger than a pair of obverse and reverse plate surfaces 51a of the upper dispersing member 51 in proportion to the extent of the urea water injected from the injection nozzle 43.

The number of the dispersing members is not limited and may alternatively be three or more. Namely, it is only necessary to construct the plurality of the dispersing members so that the fineness of the meshes of the dispersing member closer to the injection nozzle 43 is finer and the dispersing members are arranged in parallel to each other so that the plane center of each of the dispersing members is positioned on the extension of the axis of injection of the injection nozzle 43.

According to the construction, when the urea water is injected from the injection nozzle 43 to the upper dispersing member 51, a part of the urea water may collide with and adhere to the upper dispersing member 51 or be reflected and fragmentized. Namely, the urea water becomes to tend to be evaporated so as to generate ammonia uniformly in the exhaust pipe 3.

The remaining urea water passing through the upper dispersing member 51 collides with the lower dispersing member 52. Since rough parts of the mesh of the lower dispersing member 52 are close, the urea water passing through the lower dispersing member 52 is very small, and the passing urea water is fragmentized so as to be evaporated easily. The urea water colliding with the lower dispersing member 52 adheres or is reflected and fragmentized. Namely, the urea water becomes to tend to be evaporated so as to generate ammonia uniformly in the exhaust pipe 3. Therefore, by increasing the number of row of the dispersing members, ammonia becomes easy to be generated uniformly in the exhaust pipe 3. Since the upper dispersing member 51 and the lower dispersing member 52 are in parallel to the flow direction of the exhaust gas, the pressure loss of the exhaust gas is not increased.

INDUSTRIAL APPLICABILITY

The present invention can be employed for an art of an exhaust purification system purifying exhaust gas discharged from an internal combustion engine via an exhaust pipe.

The invention claimed is:

1. An exhaust purification system for an internal combustion engine comprising:
   a reduction catalyst arranged in an exhaust passage of the internal combustion engine;
   a reducing agent injecting device disposed above the exhaust passage and configured to inject a reducing agent into the exhaust passage in an angled downstream direction from an upstream side of the reduction catalyst; and
   an upper porous member and a lower porous member configured to promote evaporation of the reducing agent and fixed in the exhaust passage on the upstream side of the reduction catalyst and at positions to which the reducing agent injected from the reducing agent injecting device is sprayed,
   wherein the upper and lower porous members are parallel to a horizontal flow direction of exhaust gas,
   wherein the lower porous member is disposed downward in the angled downstream direction from the upper porous member, and
   wherein the upper and lower porous members are arranged so that planar centers of the upper and lower porous members are on an extension of an injection axis from the reducing agent injecting device.

2. The exhaust purification system for the internal combustion engine according to claim 1, wherein the reducing agent is urea water.

3. The exhaust purification system for the internal combustion engine according to claim 1,
   wherein the reducing agent injecting device has an injection nozzle, and
   wherein the injection nozzle is a single-fluid nozzle.

4. The exhaust purification system for the internal combustion engine according to claim 2,
   wherein the reducing agent injecting device has an injection nozzle, and
   wherein the injection nozzle is a single-fluid nozzle.

5. The exhaust purification system for the internal combustion engine according to claim 1, wherein the upper and lower porous members are planar members having respective plate surfaces so that the plate surface of the lower porous member is larger than the plate surface of the upper porous member in proportion to expansion of the reducing agent injected from the reducing agent injecting device.

6. The exhaust purification system for the internal combustion engine according to claim 1, wherein a mesh of the lower porous member is finer than a mesh of the upper porous member.

* * * * *